United States Patent [19]

Nilsson et al.

[11] Patent Number: 4,635,762
[45] Date of Patent: Jan. 13, 1987

[54] RAIL VEHICLE SLACK ADJUSTER

[75] Inventors: Bo Nilsson, Odengatan; Lars M. Severinsson, Hishult, both of Sweden

[73] Assignee: SAB Nife AB, Landskrona, Sweden

[21] Appl. No.: 773,248

[22] Filed: Sep. 6, 1985

[30] Foreign Application Priority Data

Sep. 7, 1984 [SE] Sweden .................. 8404272

[51] Int. Cl.⁴ ........................................... F16D 65/66
[52] U.S. Cl. .............................. 188/203; 188/196 D
[58] Field of Search ............ 188/71.9, 196 D, 202, 188/203

[56] References Cited

U.S. PATENT DOCUMENTS 3,610,376 10/1971 Baronnet et al. ............... 188/202
3,878,924 4/1975 Nadas ...................... 188/196 D X
3,899,053 12/1975 Nadas .......................... 188/203

FOREIGN PATENT DOCUMENTS 1461497 11/1966 France .

Primary Examiner—Duane A. Reger
Attorney, Agent, or Firm—Laurence R. Brown

[57] ABSTRACT

A rail vehicle slack adjuster in a brake unit has an axially movable piston rod (7), a non-rotatable, brake force delivering spindle (8), an adjuster nut (26) in non-self-locking engagement with the spindle and rotating on a bearing (18), and a barrel spring (29) between the unit piston (3) and the spindle, the adjuster nut being clutchable over a main clutch (27) to the piston rod for transmitting brake force. A non-rotatable locking sleeve (20), which is only axially movable a control distance (A) under the action of a locking spring (21), is clutchable to the adjuster nut over a control clutch (28).

6 Claims, 2 Drawing Figures

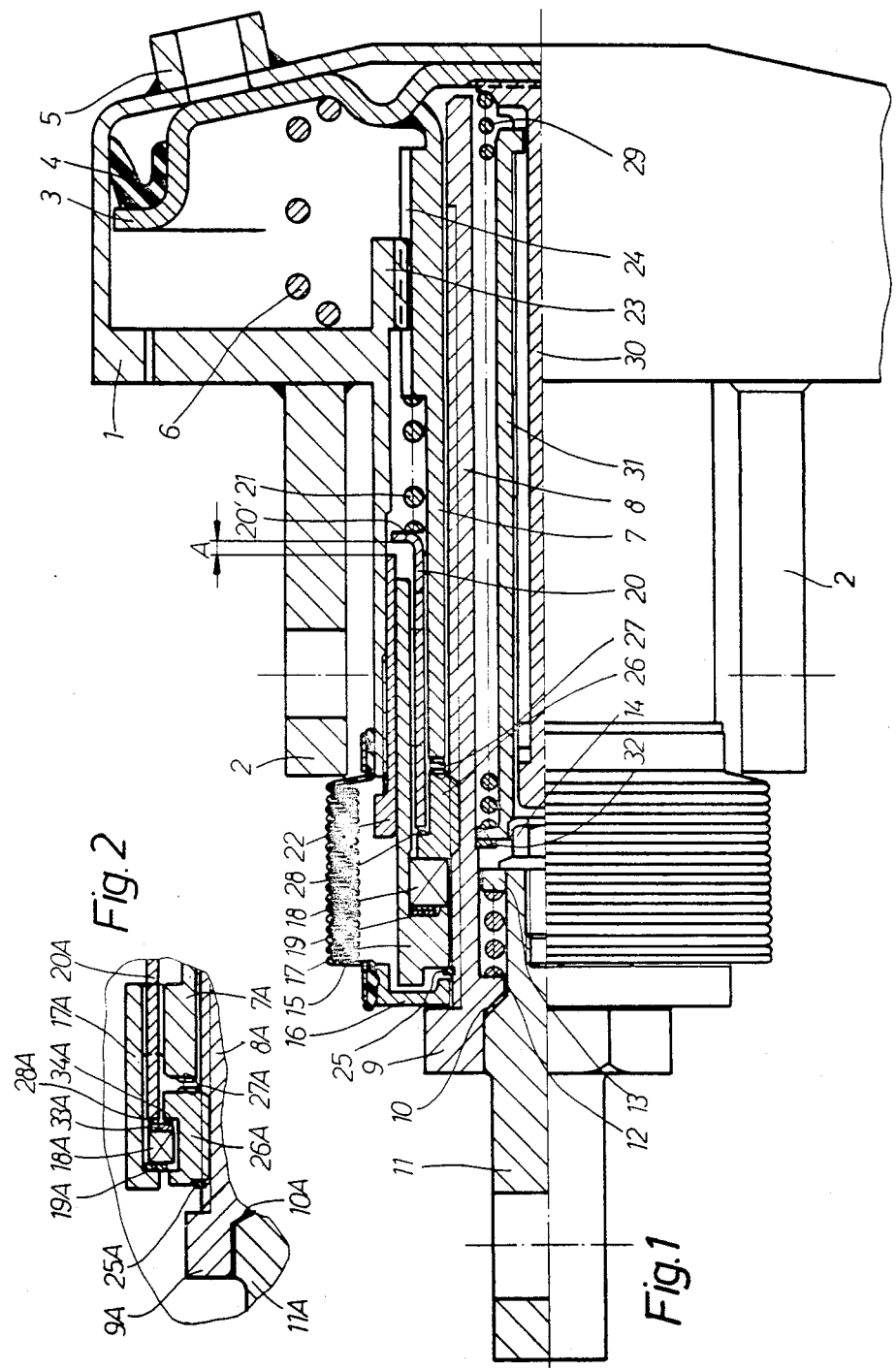

RAIL VEHICLE SLACK ADJUSTER

TECHNICAL FIELD

This invention relates to a clearance-sensing slack adjuster for a rail vehicle brake rigging, especially built-into a brake unit, including a non-rotatable, axially movable, tubular part for introducing a force in a braking direction, namely in the case of a unit a piston rod attached to a piston in a fixed housing of the unit, a non-rotatable, threaded spindle arranged coaxially inside the force-introducing part to deliver a brake force from the adjuster, an adjuster nut in non-self-locking engagement with the spindle and in the braking direction abutting a bearing in the force-introducing part, and a barrel spring, which is stronger then a return spring for the piston and acts in the braking direction between the force-introducing part and the spindle, the adjuster nut being clutchable over a main clutch to the force-introducing part for transmitting brake force.

BACKGROUND OF THE INVENTION

It is well known in the art that different requirements are put on rail vehicle slack adjusters. Generally speaking, these requirements are the same irrespective of whether the slack adjuster is of the so called axial type used as a self-contained cylinder-shaped member with slack-adjusting function in a rail vehicle brake rigging or is combined with a brake cylinder to a brake unit for use at a wheel or disc to be braked.

However, as the slack adjuster with which the present invention is concerned is primarily designed for use in a brake unit, the requirements on brake unit adjusters are of most interest in this case. The invention is, however, also applicable to axial type adjusters, and no limitation to a brake unit adjuster is intended.

The present invention is concerned with a so called one-nut adjuster, i.e. the design and function is entirely based on the use of one nut in engagement with a spindle. There is presently a tendency towards more frequent use of this type of adjuster, as such a design can be made simpler, cheaper, and more compact than a two-nut design. Numerous examples of this general type are known in the art.

Other requirements on an adjuster of this type is that it shall have a high mechanical efficiency and high accuracy as regards the obtained slack under differing working conditions. Further the design shall be sturdy and easy to protect against the influence from the harsh environment. It shall —when need arises—be easily serviceable. Last but not least the design shall be easy to adopt to different sizes and working lengths with a minimum number of differing parts.

THE INVENTION

These and other requirements are fulfilled by a slack adjuster of the type referred to at the outset, if according to the invention a non-rotatable locking sleeve, which is axially movable in the braking direction only a distance corresponding to a set control distance under the action of a locking spring, supported by the force-introducing part, and is coaxial with the force-introducing part, is clutchable to the adjuster nut over a control clutch.

In this design the arrangement is such that when during a braking operation the set control distance has been consumed, the control clutch is opened (unloaded from the force of the locking spring) leaving the adjuster nut free to rotate on the spindle against the bearing provided that the main clutch is not closed under the influence of a counter-force in the spindle.

The design principle behind the design according to the invention is that the control clutch is unloaded from the force of the barrel spring or in other words that there is a separate locking sleeve with its locking spring. This principle is earlier suggested in a quite different and much more complicated design shown in FR-A-No. 1 461 497 or—in a later version—U.S. Pat. No. 3,610,376.

In order to safe-guard a distinct and fast engagement of the main clutch a spring washer is arranged between the bearing and the force-introducing part behind the bearing in the braking direction. This spring washer will push the adjuster nut into engagement with the force-introducing part (the piston rod).

In most cases it is preferred to have a single-acting slack adjuster reducing any excessive slack. In this instance the control clutch is formed directly with the adjuster nut.

It is, however, also possible to obtain a double-acting slack adjuster. In this instance the adjuster nut extends forward in the braking direction past the bearing and is there provided with a flange for cooperation therewith with a certain play. Further, a clutch ring is arranged between on one hand the bearing and on the other hand the adjuster nut and the locking sleeve, the control clutch being formed between the locking sleeve and the clutch ring, which in parallel therewith forms a nut clutch with the adjuster nut.

BRIEF DESCRIPTION OF THE DRAWING

The invention will be described in further detail below reference being made to the accompanying drawing, in which FIG. 1 is a side view, mostly in section, of a rail vehicle brake unit with a slack adjuster embodying the invention and FIG. 2 is a section corresponding to a part of FIG. 1 and showing a modified embodiment, in which the slack adjuster is made double-acting instead of single-acting.

DESCRIPTION OF PREFERRED EMBODIMENTS

In FIG. 1 is shown a rail vehicle brake unit incorporating a single-acting slack adjuster of the clearance-sensing type according to the invention. As is well known in the art a unit of this kind is to be mounted in the vicinity of a wheel or disc to be braked, and it may equally well be used for tread braking as for disc braking.

A housing 1 shown in simplified form is provided with attachments 2 for its mounting to a suitable part of the vehicle. A piston 3 with a sealing 4 is axially movable in the housing 1 under the influence of brake fluid, in the shown case air under pressure, admitted through an inlet 5. A return spring 6 is arranged between the housing 1 and the piston 3.

A tubular piston rod or force introducing part 7 is attached to the piston 3 and extends forwards or to the left in the drawing in the housing 1, it thus being understood that the terms "forwards" and "backwards" as used throughout this specification having the meaning "to the left" and "to the right" in the drawing, respectively. Inside the piston rod is a likewise tubular spindle 8, provided with an external thread over most of its length. At its forward end the spindle 8 is provided with a tool grip 9 for the purpose of allowing manual rotation of the spindle, as will be described below.

Towards its forward end the spindle 8 is provided with clutch teeth for forming a clutch 10 with corresponding teeth on an ear 11 inserted into the spindle. The clutch 10 is normally held engaged by a helical compression spring 12 between the spindle and a spring ring 13 held on the ear 11 by the flange of a screw 14 in the end of the ear 1. In spite of the fact that the ear 11 in the mounted condition of the brake unit is non-rotatably mounted to a part of a brake rigging (not shown), it will be possible to manually rotate the spindle 8 by the provision of the spring-loaded clutch 10.

For the purpose of preventing moisture, dust and dirt from entering the slack adjuster mechanism a flexible bellows 15 is attached on one hand to the housing 1 and on the other hand to a cap 16 on the spindle 8 just inside the tool grip 9.

Coaxially outside of the piston rod 7 and integral therewith is a piston rod sleeve 17 with an internal axial ball bearing 18 backed by a spring washer 19. The connection between the piston rod 7 and its sleeve 17 is broken at circumferentially spaced locations for allowing axial movements of a fingered locking sleeve 20.

This locking sleeve 20 is biased forward by a locking spring 21 of the helical compression type acting on a flange 20' of the sleeve 20 and supported by an edge (to be described) on the piston rod 7. The forward movement of the locking sleeve 20 is, however, limited by a control distance sleeve 22 threaded into the housing 1 and together with the sleeve flange 20' defining a control distance A, which easily can be adjusted by rotating the control distance sleeve 22.

The housing 1 is provided with an internal guide ring 23 in spline-type engagement with external guide ridges 24 on the piston rod 7, which thus will only move axially in the housing 1. The spindle 8 in turn is guided by the piston rod 7 as well as the piston rod sleeve 17. There is a locking ring 25 on the spindle 8 in front of the piston rod sleeve 17. By the provision of an unthreaded spindle part to the right in the drawing, the spindle 8 is prevented from unintentionally leaving its engagement with the nut 26 and thus form leaving the unit.

In non-self-locking engagement with the spindle 8 is an internally threaded adjuster nut 26 abutting the bearing 18. The adjuster nut is provided with two clutch teeth rings for cooperation with corresponding clutch teeth at the end of the piston rod 7 and the locking sleeve 20, respectively, for forming a main clutch 27 and a control clutch 28, respectively.

A barrel spring 29 of the helical compression type acts between the piston 3 and the spindle 8. The spring 29 is arranged between respective end flanges of two mounting sleeves 30 and 31, which are only axially movable relative to each other by a pin and groove arrangement. The initial mounting is made possible by the provision of a bayonet type joint, which is indicated at the forward end of the inner sleeve 30. The provision of the sub-assembly consisting of the barrel spring with its two mounting sleeves greatly facilitates the final mounting of the unit.

The inner sleeve 30 abuts the piston 3 with its end flange having a ridge in cooperation with a corresponding groove in the piston 3. The opposite end of the other sleeve 31 has a socket shaped as and passed over the hexagonal screw 14. In this way it is possible—before the mounting of the unit—to adjust the length of the unit or in other words the position of the spindle 8 relative to the nut 26 by turning the ear 11 and thereby the whole sub-assembly consisting of the following main components: the ear 11, the spindle 8, the sleeves 30 and 31, and the barrel spring 29, which acts on the spindle over a locking ring 32.

Based on the assumption that the slack is excessive, or in other words that the slack between a wheel or disc to be braked by the brake unit with its brake rigging and the brake block or brake pad is greater than what corresponds to the set control distance A, the function of the described unit is as follows:

At the admission of pressurized brake fluid through the inlet 5 the piston 3 with its piston rod 7 will be pushed forward (to the left in the drawing). Concurrently therewith the locking sleeve 20, the adjuster nut 26 (the control clutch 28 being closed by the spring 21), the spindle 8, and the ear 11 will also move forward under the force from the spring 21 (as well as from the barrel spring 29, always applying its force on the spindle 8). When the locking sleeve flange 20' hits the control distance sleeve 22, the control clutch 28 opens leaving the adjuster nut 26 free to rotate on the spindle 8.

The application stroke can now continue under the force from the barrel spring 29 pushing the spindle 8 with the ear 11 forward, until the application stroke is finished in that the brake block or pad hits the wheel or disc to be braked. During this fast application stroke consuming the excessive slack the adjuster nut 26 rotates on the spindle 8 against the bearing 18.

At the continued axial movement forward of the piston 3 with the piston rod 7 the main clutch 27 will soon be closed assisted by the spring washer 19 preventing any further rotation of the nut 26. After consumption of the thread play between the adjuster nut 26 and the spindle 8, the elasticity in the brake unit and the brake rigging with which it is connected will be taken up, whereupon the brake force corresponding to the brake fluid pressure on the piston 3 will be transmitted via the piston rod 7, the adjuster nut 26, the spindle 8, and the ear 11.

At the subsequent lowering of the fluid pressure against the piston 3 a brake release movement under the action of the return spring 6 will commence. At the beginning of the return stroke the adjuster nut 26 is held against rotation by the main clutch 27 being closed, whereas control clutch 28 is open (due to the fact that during the elasticity and braking parts of the application stroke the piston rod 7, the nut 26 and the spindle 8 has moved forward as a unit a certain distance, whereas the locking sleeve 20 has stopped because of its engagement with the control distance sleeve 22).

This condition prevails until the counter-force from the brake block or pad lowers or in other words the block or pad is just about to leave the wheel or disc, so that the main clutch 27 opens. If as usual a certain excessive slack has developed during the braking, the control clutch 28 will remain open, so that the adjuster nut 26 is free to rotate (aided by the spring 19) until a slack corresponding to the control distance A has been restored and the control clutch 28 is closed.

At the end of the release stroke the different parts of the brake unit assume the positions shown in the drawing.

It appears that the slack adjuster of the unit shown in FIG. 1 is single-acting, consuming an excessive slack in one brake operation. It also appears that the adjuster is of the clearance-resisting type. If—as is most normal—the excessive slack develops during the braking operation as a result of wear, the slack adjustment occurs during the release stroke.

In a brake operation with correct slack no rotation of the adjuster nut 26 will occur neither during the application stroke nor the release stroke.

Manual adjustment in either direction—for example after the replacement of a worn-out brake block or pad—can be performed by turning the spindle 8 over the tool grip 9 overcoming the clutch 10 normally held engaged by the force of the spring 12.

In some cases it may be preferred to have a double-acting adjuster in the unit, i.e. an adjuster removing not only a slack which is too large but also one which is too small. Based on the single-acting design shown in FIG. 1 only relatively minor modifications are necessary for arriving at a double-acting version, as appears from FIG. 2, where members common with the FIG. 1 version have the same numerals with the addition of the letter A. Thus the following members—differing only slightly from those of FIG. 1—may be found in the FIG. 2 version: a piston rod 7A with a piston rod sleeve 17A, a spindle 8A with a tool grip 9A, a clutch 10A, an ear 11A, a bearing 18A, a spring washer 19A, a locking sleeve 20A, a locking ring 25A, an adjuster nut 26A, and a main clutch 27A between the piston rod 7A and the nut 26A.

In this case a separate clutch ring 33A is arranged on the bearing 18A. This ring having two sets of clutch teeth forms a control clutch 28A with the locking sleeve 20A and a nut clutch 34A with the adjuster nut 26A.

If the slack is too small adjustment occurs during the application stroke, when the control clutch 28A is closed and the main clutch 27A is open, allowing the nut 26A to move out of engagement with the nut clutch 34A and rotate on its forward flange, until the flange 20' hits the control distance sleeve 22 (FIG. 1).

It is to be noted that in spite of its compact design and comparatively limited length the brake unit—due to the inventive slack adjuster—has a very long working stroke. Also, only few changes are necessary in order to adopt the unit to different working forces and strokes. Another advantage to be noted is that a mechanical parking brake, which is necessary in many cases, may easily be arranged without any enroachment in the described mechanism: any parking brake mechanism can be attached to the cap 16, thus acting in the brake application direction on the tool grip 9 of the spindle 8.

Modifications are possible within the scope of the appended claims. Especially it should be noted that the disclosed slack adjuster design, although being specified as of the pushing type built-into a brake unit, can equally well be modified to an axial rod-type adjuster of pushing or—more common—of pulling type, as is well known to any person skilled in the art.

We claim:

1. A clearance-sensing slack adjuster for a rail vehicle brake rigging, including a non-rotatable, axially movable, tubular force-introducing part (7, 17) for introducing a force in a braking direction, in a fixed housing (1) a non-rotatable, threaded axially movable spindle (8) arranged coaxially inside the force-introducing part to deliver a brake force from the adjuster, an adjuster nut (26) in non-self-locking engagement with the spindle for engaging the force-introducing part and in the braking direction abutting a bearing (18) bearing against the force-introducing part, and a barrel spring (29), acting in the braking direction between the force-introducing part and the spindle, the adjuster nut forming a clutchable surface of a main clutch (27) surface of the force-introducing part thereby for transmitting brake force, characterized in that a non-rotatable locking sleeve (20), which is axially movable in the braking direction only a distance corresponding to a set control distance (A) under the action of a locking spring (21) supported by the force-introducing part (7, 17), is coaxial with the force-introducing part (7, 17), and the sleeve forms a clutchable surface to engage the adjuster nut (26) thereby forming a control clutch (28), the main clutch (27) selectively coupling braking forces from the force-introducing part to the spindle, and the control clutch (28) controlling the rotation of said adjuster nut (26) when the main clutch (27) is disengaged.

2. A slack adjuster according to claim 1, characterized in that a spring washer (19) is arranged between the bearing (18) and the force-introducing part (17) to assist the engagement of the main clutch (27) surfaces.

3. A slack adjuster according to claim 1, characterized in that the control distance (A) is defined between a flange (20') on the locking sleeve (20) and a control distance sleeve (22) adjustable on a cylinder-shaped part of the housing (1).

4. A slack adjuster according to claim 3, characterized in that the locking spring (21) is arranged between the locking sleeve flange (20') and an edge (24) of the force-introducing part (7).

5. A slack adjuster according to claim 1, characterized in that the control clutch (28) is formed between the locking sleeve (20) and the adjuster nut (26) so as to produce a single-acting adjuster (FIG. 1).

6. A double acting slack adjuster (FIG. 2) according to claim 1, characterized in that the adjuster nut (26A) is grooved to receive the bearing (18A) with a certain play, a clutch ring (33A) is arranged between the bearing and the adjuster nut, the locking sleeve (20A) being movable to engage the clutch ring (33A), thereby forming the control clutch (28) between the locking sleeve and the clutch ring, and in parallel therewith a nut clutch (34A) between the adjuster nut and the clutch ring (33A).

* * * * *